United States Patent
Brath et al.

(10) Patent No.: US 10,364,796 B2
(45) Date of Patent: Jul. 30, 2019

(54) CONTROL METHOD FOR A WIND TURBINE

(71) Applicant: VESTAS WIND SYSTEMS A/S, Aarhus N (DK)

(72) Inventors: Per Brath, Randers Nv (DK); Martin Ansbjerg Kjær, Harlev J (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 485 days.

(21) Appl. No.: 15/022,876

(22) PCT Filed: Sep. 16, 2014

(86) PCT No.: PCT/DK2014/050285
§ 371 (c)(1),
(2) Date: Mar. 17, 2016

(87) PCT Pub. No.: WO2015/039665
PCT Pub. Date: Mar. 26, 2015

(65) Prior Publication Data
US 2016/0230741 A1   Aug. 11, 2016

(30) Foreign Application Priority Data
Sep. 17, 2013   (DK) .................................. 2013 70512

(51) Int. Cl.
*F03D 17/00*   (2016.01)
*F03D 7/02*   (2006.01)
(Continued)

(52) U.S. Cl.
CPC ......... *F03D 7/0224* (2013.01); *F03D 1/0666* (2013.01); *F03D 7/043* (2013.01);
(Continued)

(58) Field of Classification Search
None
See application file for complete search history.

(56) References Cited

U.S. PATENT DOCUMENTS 9,519,056 B2 * 12/2016 Schroeder ............... G01S 13/95
2006/0140764 A1   6/2006 Smith et al.
(Continued)

FOREIGN PATENT DOCUMENTS

| CN | 1856645 A | 11/2006 |
| CN | 1975155 A | 6/2007 |

(Continued)

OTHER PUBLICATIONS

International Search Report for PCT/DK2014/050285, dated Sep. 16, 2014.
(Continued)

*Primary Examiner* — Jason D Shanske
*Assistant Examiner* — Theodore C Ribadeneyra
(74) *Attorney, Agent, or Firm* — Patterson + Sheridan, LLP

(57) ABSTRACT

The invention relates to a method of controlling a wind turbine, the wind turbine comprising wind turbine blades attached to a rotor hub and a control system for pitching the blades relative to the hub. The method comprises providing wake sectors assigned to different wind directions and providing a normal pitch schedule to control an output parameter of the wind turbine (e.g. power, rotational speed), comprising pitch reference values as a function of the wind speed and at least one of the parameters of thrust coefficient $C_t$ and axial induction factor a. Further, is provided a modified pitch schedule to control a modified output parameter of the wind turbine, comprising pitch reference values in dependence of the wind speed and at least one modified parameter of the thrust coefficient and/or the axial induction (Continued)

factor. Upon receiving indications of a wind speed and a wind direction at the wind turbine is determined a pitch reference value for the wind turbine blades according to the normal pitch schedule if the wind direction falls outside the wake sector and otherwise according to the modified pitch schedule. The wind turbine is then controlled according to the pitch reference value. The invention further relates to a method of controlling the wind turbines in a wind park, wherein each wind turbine in the park is controlled locally according to the above mentioned control method.

18 Claims, 7 Drawing Sheets

(51) Int. Cl.
*F03D 7/04* (2006.01)
*F03D 1/06* (2006.01)
(52) U.S. Cl.
CPC ............ *F03D 7/048* (2013.01); *F03D 17/00* (2016.05); *Y02E 10/721* (2013.01); *Y02E 10/723* (2013.01)

(56) References Cited

U.S. PATENT DOCUMENTS

| 2007/0124025 A1* | 5/2007 | Schram ................. F03D 7/0224 |
| | | 700/287 |
| 2009/0099702 A1 | 4/2009 | Vyas et al. |
| 2011/0142619 A1 | 6/2011 | Subramanian et al. |
| 2012/0133138 A1 | 5/2012 | Soerensen et al. |
| 2013/0103202 A1 | 4/2013 | Bowyer et al. |
| 2013/0156577 A1 | 6/2013 | Esbensen et al. |
| 2013/0166082 A1 | 6/2013 | Ambekar et al. |
| 2013/0184884 A1 | 7/2013 | More et al. |

FOREIGN PATENT DOCUMENTS

| CN | 101413483 A | 4/2009 |
| CN | 101592130 A | 12/2009 |
| CN | 101876289 A | 11/2010 |
| CN | 103161666 A | 6/2013 |
| EP | 249029 A1 | 12/1987 |
| EP | 2090775 A2 | 8/2009 |
| EP | 2306004 A2 | 4/2011 |
| EP | 2 604 853 A1 | 6/2013 |
| WO | 2012/129435 A2 | 9/2012 |
| WO | 2013/037374 A1 | 3/2013 |

OTHER PUBLICATIONS

Danish Search Report for PA 2013 70512, dated May 7, 2014.
Communication of a Notice of Opposition, European Patent Office, for Applicaiton No. 2013P00044WE dated Nov. 29, 2018.
NTD Patent and Trademark Agency Limited Chinese First Office Action for Application No. 201480051263.3 dated Dec. 18, 2017.

* cited by examiner

CONTROL METHOD FOR A WIND TURBINE

FIELD OF THE INVENTION

The present invention relates to a method of controlling a wind turbine, the wind turbine comprising wind turbine blades attached to a rotor hub and a control system for pitching the blades relative to the hub with the aim of taking into account wake effects on other wind turbines. The invention furthermore relates to a method of controlling the wind turbines in a wind park.

BACKGROUND

Turbines are often erected in groups, or wind turbine parks, and operated synchronized to mimic the behaviour of a power plant. In wind turbine parks comprising multiple wind turbines, the individual wind turbines operate in a complex aerodynamic environment due to the unsteady, turbulent nature of the wind field. Additionally, as the turbines extract power from the wind, they produce a wake behind them of generally lower wind speed and of a higher turbulence rating. Due to space considerations the distance between the individual turbines is often such that turbines are in the wind-shadow or wake of other turbines for specific wind directions. All turbines operating in a wake will encounter lower wind speeds than the ambient wind speed outside the plant, and more turbulent wind. This results in a lower performance, and a higher fatigue loading. This may be seen as a reduced total power production of the wind park compared to the total power to be expected from the same number of individual turbines placed separately. The primary "wake loss", designated as the difference between the power curve of an individual turbine and the mean or median park power curves, occurs in the partial power region of the operational regime (usually at wind speed between 3-12 m/s).

Additionally, the wake loss is seen to depend on the state of the atmospheric boundary layer. Depending upon the ambient temperature distribution in the atmosphere and time of day, the atmosphere can either be classified as neutral, stably stratified, or convectively unstable. The evolvement of the wake downstream depends on the state of the atmosphere, and therefore the power distribution along rows of turbines also is very sensitive to the state of the atmosphere. It has be seen that there may be approximately a 20% difference in downstream performance with different atmospheric conditions.

While the concept of a "row" of wind turbines is straightforward, often the wind sector forces turbines to operate in an unstructured mode, where rows of well aligned turbines cannot be defined. In such wind directions, situations where one turbine is partially waking a downstream turbine will occur.

For larger wind turbine parks, wake losses are inevitable but the siting process most often aims at minimizing the wake losses in the wind directions offering the most wind energy by the positioning of the turbines. However, as turbines cannot be moved, wind shadowing will eventually occur in some wind directions, causing wake losses. Even though wake losses cannot be avoided for larger farms with turbines erected relative close to one another, the magnitude of the losses can be affected by choice of the operating strategy for the individual turbines.

Today, the operation strategy for the turbines is often focused on optimizing the individual turbines according to the local experienced wind speed and wind direction. Also, much effort over the years have been focused on optimizing the individual turbines to produce as much power as possible taking into account the variation of the local wind conditions and the internal conditions in the turbine (such as oil pressure and converter temperatures). However, as the possible productions of the individual turbines in a park are in some situations dependent on one another, it is not given that the overall production of the park is the highest when each turbine produces as much power as possible under the given wind conditions. Rather, it has been proven that in some cases restricting the power production on some turbines leads to a higher power production of the entire farm.

Further, in some wind turbine parks, the wind turbines are controlled and regulated by inter-turbine coordination through communication and from one central processing unit. Known control methods for wind turbine parks include collecting data row-wise from each wind turbine of the park at a central processing or control unit which from these data determines potential wake conditions for some of the turbines. For each row some optimization calculations may then be performed to determine the optimal power production for the row, and adjusted control signals are then transmit to each turbine in each row to reduce the power output of selected upstream turbines. The controlling is thereby dependent on the central control unit and on the communication between the turbines which makes the system more vulnerably, complex, and involves a certain non-negligible response time or delay in the controlling.

SUMMARY OF THE INVENTION

It is therefore an object of embodiments of the present invention to provide a control method for a wind turbine which obviate or reduce some of the above mentioned problems in known controlling methods.

It is a further object of the invention to provide a control strategy for the wind turbines in a wind turbine park encompassing such variables influencing the wake loss such as the wind direction, the turbulence level, mean wind velocity, temperature, and optionally the time of day.

It is a further object of the invention is to provide a control method for increasing the annual energy production (AEP) of the wind turbine park while maintaining or reducing the fatigue loading on the turbines generated from the atmospheric boundary layer and wind turbine wakes.

It is a further object of the invention is to provide a control method for increasing the annual energy production (AEP) of the wind turbine park through a control method applied on one or more of the wind turbines individually.

A further object of the invention is to provide a simple yet effective control method for the individual turbines in a wind turbine park taking into account the wake effects between the turbines for most or all wind direction.

A further object of the invention is to provide a simple yet effective control method for the individual turbines in a wind turbine park while at the same time maintaining a high energy production of the wind turbine park.

It is a further object of the invention to provide a control method which in a simple and effective way may react fast and reliable to changes in the wind load conditions.

In accordance with the invention this is obtained by a method of controlling a wind turbine comprising wind turbine blades attached to a rotor hub and a control system for pitching the blades relative to the hub. The method comprises providing at least one wake sector assigned to one or more wind directions and providing a normal pitch schedule to control an output parameter of the wind turbine (e.g. power, rotational speed), comprising pitch reference values as a function of the wind speed and at least one of the parameters of thrust coefficient $C_t$, aero dynamical power coefficient $C_p$, and axial induction factor a. Further, a modified pitch schedule is provided to control a modified output parameter of the wind turbine, comprising pitch reference values in dependence of the wind speed and at least one modified parameter of the thrust coefficient, aero dynamical power coefficient, and/or the axial induction factor. The method further comprises receiving indications of a wind speed and a wind direction at the wind turbine, and determining a pitch reference value for one or more of the wind turbine blades according to the normal pitch schedule if the wind direction falls outside the at least one wake sector. Only if the wind direction falls within the at least one wake sector a pitch reference value for one or more of the wind turbine blades according to the modified pitch schedule is determined. The wind turbine is then controlled according to the pitch reference value.

According to the above, the individual turbines will comprise a normal as well as one or more modified pitch strategies which are applied in dependence of the wind direction. Hereby appropriate consideration may be taken to the wind direction, and to any special conditions that may apply to that specific wind direction. By the assignment of one or more wake sectors to such specific wind directions and in which sectors special modified pitch strategies apply, the pitch strategy and thereby the resulting output parameter may easily and simply be adjusted as a function of the wind direction.

By providing a modified pitch schedule comprising pitch reference values in dependence of the wind speed as well as of at least one modified parameter of the thrust coefficient, aero dynamical power coefficient, and/or the axial induction factor, is exploited the theoretically obtained result that the output parameter may be optimized by modifying any of the thrust coefficient, aero dynamical power coefficient, and/or the axial induction factor.

The output parameter to be modified may be e.g. the electrical power, the rotational speed, or the thrust of the wind turbine.

According to an embodiment of the invention the wind turbine is placed in a wind turbine park comprising a number of wind turbines, and the at least one wake sector reflects a sector of wake influence by this wind turbine on one or more of the other wind turbines in the park by a wind in a direction within the wake sector. The wake influence may be on the neighbouring wind turbine and/or on a turbine further away.

Hereby is obtained a simple yet effective control method for increasing the performance such as the annual energy production (AEP), not necessarily of the individual wind turbine, but of an entire wind farm comprising a number of wind turbines, while taking into account the wake effects between the turbines for most or all wind direction.

By the use of wake sectors is obtained a simple way of describing how the different turbines shadow partly or fully for each other without being restricted to patterns of e.g. rows and columns.

By the above described control method is obtained a method where each wind turbine may be controlled individually based on locally measured wind speed and wind direction and without being dependent on any central controlling receiving and sending data and information from and to all other turbines in a park. The obtained control method may thereby work faster and allow for a faster adaption and control of each wind turbine in dependence of the measured wind speed and wind direction. Further the control method may be more robust in that each wind turbine may be controlled independently of the others in the wind park and therefore is independent on any communication means.

The control method according to the above may both be applied to new wind parks without any operational history, or likewise as an upgrade to existing wind parks simply by adding one or more wake modes to one or more of the wind turbines.

The wake modes and corresponding control method may be applied to one or more, or to all the wind turbines in a wind park thereby maximizing its effect on the total power output of the entire park. In an embodiment, the control method may be applied to the wind turbines in a wind park influencing the other wind turbines the most and/or the most often, such as for example the most forwardly placed turbine or turbines in the prevailing wind directions or the largest wind turbine.

According to an embodiment of the invention the wind turbine is placed in a wind turbine park comprising a number of wind turbines, and the at least one wake sector reflects a sector of wake influence by this wind turbine on one or more of the other wind turbines in the park by a wind in a direction within the wake sector.

In an embodiment, the method further comprises pre-assigning each wake sector with a wake mode, and assigning for each wake mode a different modified pitch schedule, and wherein the method further comprises determining the present wake mode from the wake sector given by the received wind direction, and wherein the pitch reference value is determined according to a modified pitch schedule corresponding to the present wake mode.

Hereby may be applied a number of different wake modes with corresponding different or partly different modified pitch schedules. The control method may in this way take into account wind sectors of more or less severe character, or sector in which the turbine may e.g. only influence the other turbines partly. The control method hereby may be made more detailed taking more effects of the different wind directions into account. The resulting total power production for the wind park may in this way also be closer to the theoretical optimum.

In an embodiment, the method according to the above may further comprise assigning for each wake mode a threshold parameter of the thrust coefficient, aero dynamical power coefficient and/or a threshold axial induction factor, and wherein the modified parameters of the thrust coefficient, aero dynamical power coefficient and/or the axial induction factor are modified such as not to exceed the threshold parameter.

It has been found through theoretical and numerical optimizations of the total output of a given wind park in general yields optimized parameters of the thrust coefficient, aero dynamical power coefficient and/or a threshold axial induction factor as a function of the wind speed which are truncated functions of the corresponding nominal parameters. The optimized parameters may therefore be determined simply and effectively by the setting of a threshold parameter which the parameter may not exceed for all wind speeds. In this way no advanced computations or optimizations need to be performed during the controlling. Rather, the theoretical and numerical optimization results may be exploited to simply modify one or more of the parameters according to a truncated function as described above. Hereby is obtained a fast and simple and robust yet effective control method which may react fast to changing wind conditions while effectively increasing the total output of a wind park taking into account the wake effect.

The threshold parameter for a wake mode may e.g. be set as a percentage of the maximal thrust coefficient, aero dynamical power coefficient and/or maximal axial induction factor, such as in the range of 50-95%, such as 70-80%. It has been found that thresholds in such ranges embrace by far the most theoretically optimized functions yielding a total output close to the optimal.

Additionally or alternatively the threshold parameter for a wake mode may be set as a predefined constant and/or as a function of the wind speed.

The wake sectors may be pre-determined and/or the wake modes may be pre-assigned to each wake sector. The wake sectors and the corresponding wake modes may for example be predetermined when planning the siting of the wind turbines in a wind park and their placing relative to each other.

Additionally or alternatively the wake sectors and/or the wake modes assigned to each wake sector may be set, modified, or updated during operation of the wind turbine if for example more turbines are erected nearby causing the wake fields to be changed for some wind directions.

Likewise, the normal pitch schedule and/or the one or more modified pitch schedule and/or the modified parameters of one of the parameters of thrust coefficient $C_t$, aero dynamical power coefficient $C_p$, and axial induction factor a may be predetermined. In an embodiment the modified parameters of the thrust coefficient $C_t$, aero dynamical power coefficient $C_p$ and/or the axial induction factor are determined from predetermined look-up tables. For instance as a result of optimization computations or estimates performed for a number of wind turbines in a park with the objective of maximizing the total power production for different wind directions taking into account the wake effects and wake losses. Hereby, the pitch schedule and the modified parameters may be determined fast and simple allowing for a correspondingly fast and robust control method.

Additionally or alternatively the modified pitch schedule and/or the modified parameters may be updated during operation of the wind park e.g. to take into account changes made to the wind park or the turbines therein.

According to an embodiment of the invention, the steps of the wind turbine control are performed locally at the wind turbine such as without communication to the other wind turbines in the park. As previously mentioned, this allows for a faster working and more robust control of one turbine being independent on any central controlling unit and communication means. Further, each turbine may hereby adapt faster to the measured wind speed and wind direction.

According to an embodiment of the invention, the wake modes consist of a mode of normal power production and a mode of reduced power production. Hereby only two modes are applied in the control method thereby yielding a very simple yet effective control method still taking into account the wake effects. This further yields the advantage of only having to test and approve one wake mode being the alternative to the normal production mode. The method may therefore be applied faster to existing wind parks as the time to approval is kept minimal.

In an embodiment of the invention the wind speed and the wind direction are measured locally on the wind turbine hereby rendering the wind turbine control independent of receiving any data from a central unit or other wind turbines. Furthermore, the locally measured wind speed and wind direction most likely describe the wind conditions governing the performance of the wind turbine more accurately than data measured some distance away.

Finally, an embodiment of the invention relate to a method of controlling the wind turbines in a wind park, wherein each wind turbine in the park is controlled locally according to any of the above mentioned embodiments. The advantages hereof are as described above in relation to the method of controlling a wind turbine.

BRIEF DESCRIPTION OF THE DRAWINGS

In the following different embodiments of the invention will be described with reference to the drawings, wherein.

DETAILED DESCRIPTION OF THE DRAWINGS

Figure 1:
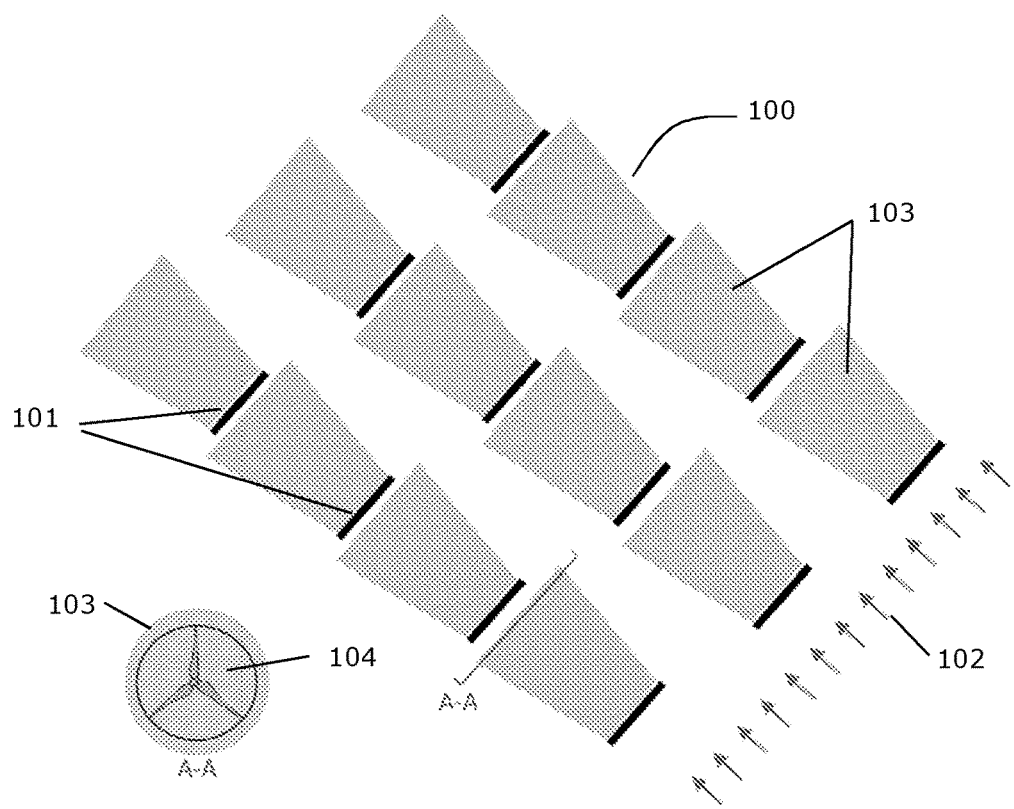
FIG. 1 is a sketch of wind turbines in a park with a full wake scenario.
Figure 2:
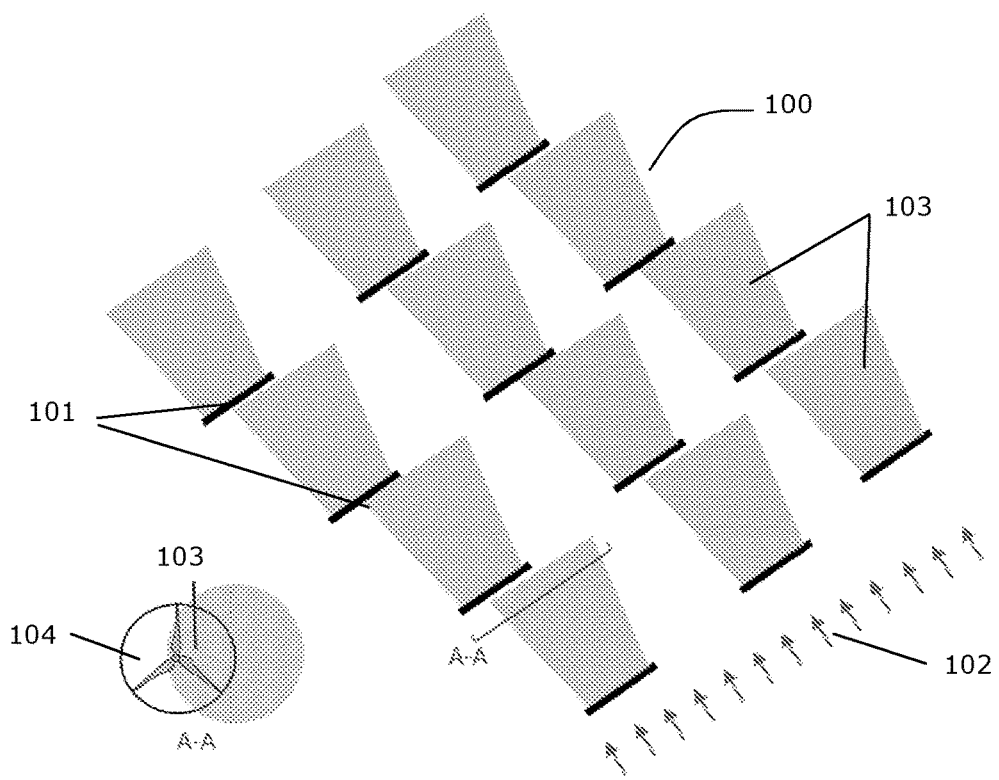
FIG. 2 is a sketch of wind turbines in a park with a partial wake scenario.

In FIG. 1 is illustrated a wind turbine park 100 wherein a number of wind turbines 101 are placed. Depending on the direction of the incoming wind 102 the upstream wind turbines create a wake affecting the downstream turbines changing their wind conditions locally and increasing the turbulence rating. In FIG. 1 the turbines are positioned in straight rows in the wind direction 102 whereby the upstream turbines creates a wake 103 fully covering its downstream turbines. Each wind turbine may create a wake not only for the first downstream turbine but the wake may likewise affect the turbines further down the row (not shown). While the concept of a "row" of wind turbines is straightforward, often the wind sector forces turbines to operate in an unstructured mode, where rows of well aligned turbines cannot be defined. In such wind directions, situations where one turbine is partially waking a downstream turbine will occur as illustrated in FIG. 2. This may likewise be the situation if the wind turbines are not placed in a grid of rows. FIGS. 1 and 2 show as an example the same park layout 101 for two different wind directions 102. FIG. 1 portrays a wind direction where rows of turbines are easily defined, and are "fully waked" by their upstream counterparts. FIG. 2 illustrates a wind direction where the wakes 103 propagate in a skewed direction relative to the row orientation. Thus, downstream turbines are only "partially waked" by their upstream counterparts as also illustrated in the small inserts showing the rotor disk 104 of a turbine with the wake 103 (grey shaded area) fully or partially covering the rotor plane.

In the situation in FIG. 2, the loads on the downstream turbines will generally be higher because a part of the rotor disk 104 will be seeing the effective "wake velocity" while the other part will be seeing a higher ambient wind velocity, leading to a discrepancy in loading on the individual blades and a moment transferred to the rotor shaft. In a full wake scenario, the velocity across the rotor disk will generally be more uniform than a partial wake event (although still lower than the ambient wind speed).

Further, as the turbines extract power from the wind, the downstream turbines in fully or partial shadow from one or more upstream turbines experience lower wind speeds, and thus cannot produce as much power as if exposed to free wind conditions. In other words, the turbine is subject to a shadow loss, or wake loss, as often denoted. Especially for larger parks, such wake losses are inevitable and may be considerable.

By the use of mathematical models for the power production of each wind turbine the optimal settings of the individual turbines can be found maximizing the total power production of the wind park for a given wind direction.

Applying a static approach to modelling the turbines the power of a turbine is given by $$P = \frac{\rho \pi D^2}{8} c_p v^3$$

with $c=4a(1-a)^2$ where a is the axial induction. The variables D and $\rho$ are the rotor diameter and the air density, respectively. A standard air density of $\rho=1.225$ kg/m$^3$ is assumed. The variable a is the axial induction factor which describes the fraction of wind energy captured by the rotor. The wind speed is denoted v and P is the aerodynamically power produced by the turbine.

The main objective of the optimization can be formulated to maximize the produced power in steady state at different wind speeds for a given wind turbine park design. The axial induction factor a is used as a design variable for the optimization. To insure that the loads are not increased, a is furthermore restricted to be below the standard values. The value of a can be chosen independently for each turbine and each wind speed.

For a given wind speed and a given spacing, a number of different combinations of axial inductions factors have been evaluated. First, the axial induction factor of the most upwind turbine was swept from normal value to 20% of the normal value, and the solution resulting in highest power production (on plant level) was chosen. Then the second turbine was optimized in the same manner, and so forth, until all turbines have been optimized. This procedure was iterated a number of times, until no further power increase is obtained and the optimization procedure have converged. The procedure was executed for relevant wind speeds and relevant spacing sizes.

Figure 3:
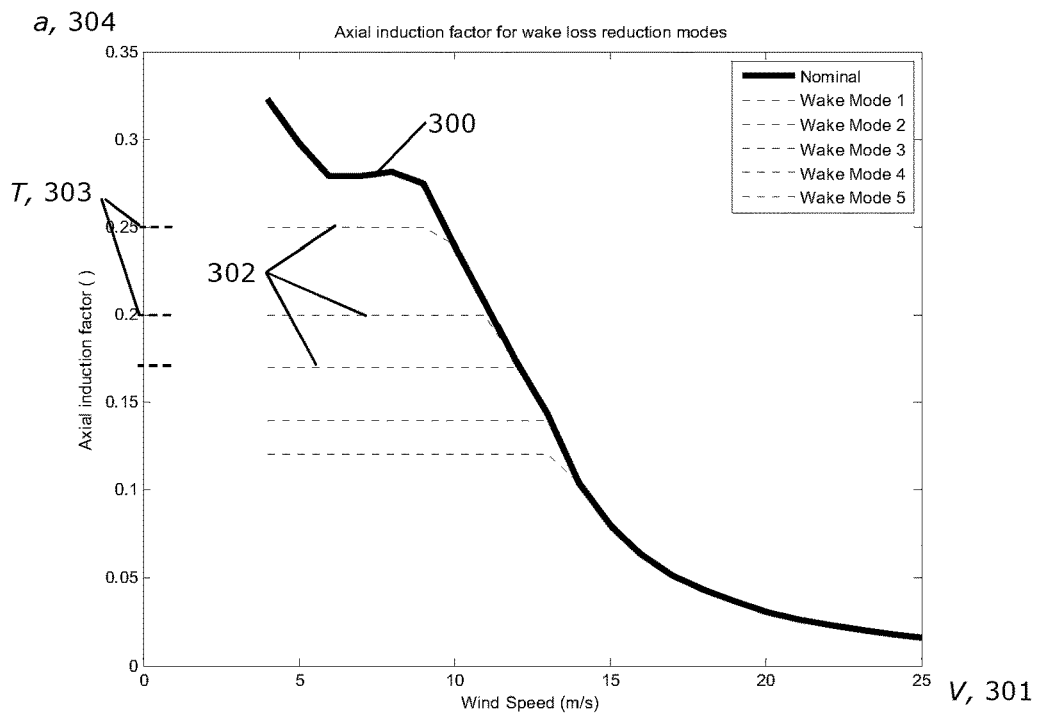
FIG. 3 illustrates the nominal and modified axial induction factors as a function of wind speed for different wake modes according to an embodiment of the invention.

By the above described optimization processes for optimizing the total power production of an assembly of turbines have surprisingly been found that for a given turbine park configuration, the optimal axial induction factor a, 304 as a function of the wind speed V, 301 for each wind turbine can be expressed by a truncation of the nominal axial induction factor. Such optimal curves for axial induction factors a, 304 are shown in FIG. 3 together with the nominal axial induction factor 300 and as function of the wind speed V, 301. The thick black line 300 shows the nominal axial induction factor whereas the dashed curves 302 show examples of optimized axial induction factor for different wind directions and park configurations. As can be seen from the figure, the optimal axial induction factor yields a truncation of the nominal axial induction factor corresponding to the setting of a threshold T, 303 of the axial induction factor which is not exceeded for any wind speeds.

Figure 4:
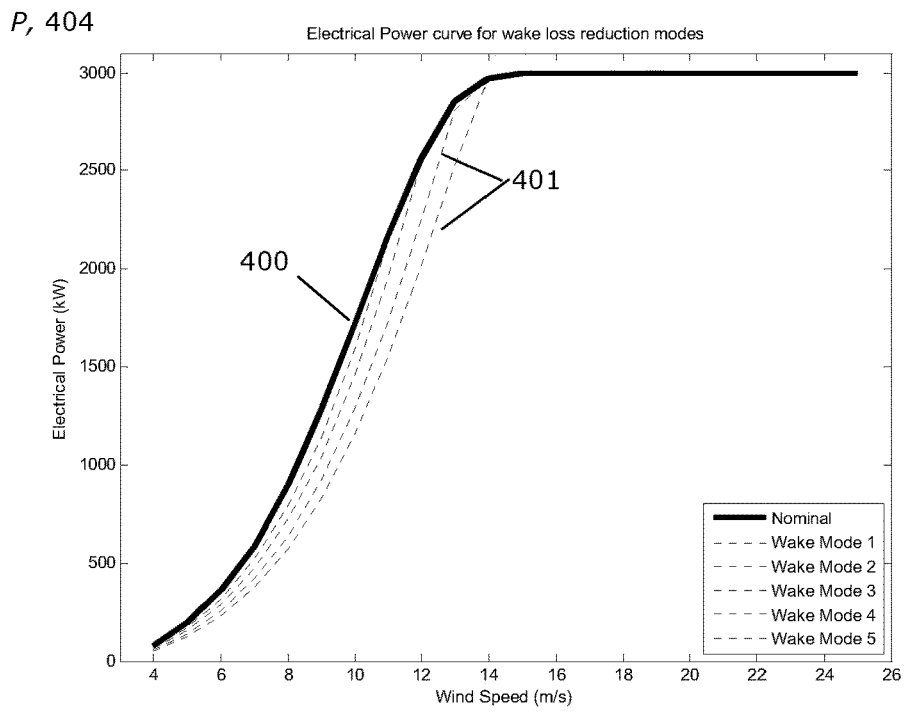
FIGS. 4-5 illustrate the resulting electrical power and thrust curves for the different wake modes shown in FIG. 5 according to an embodiment of the invention.
Figure 5:
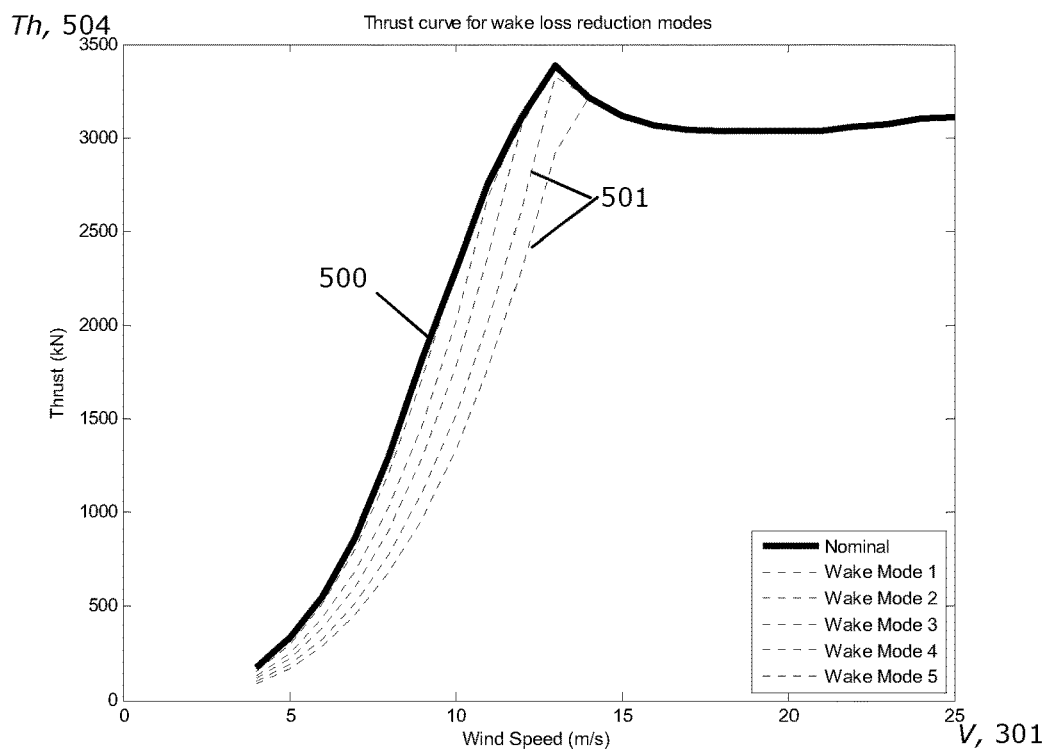

The corresponding curves of electrical power P, 404 and thrust Th, 504 as functions of the wind speed 301 are shown in FIGS. 4 and 5, respectively. The nominal electrical power and thrust curves (400, 500) are shown in solid black lines, whereas the modified electrical power and thrust curves (401, 501) corresponding to different truncated and optimized axial induction factors are shown in dashed lines. It can be seen that the reduction in axial induction factor a as shown in FIG. 3 result in a reduction of electrical power and thrust, respectively, at lower wind speeds and primarily at intermediate wind speeds between approximately 6-10 m/s. The electrical power and the thrust are however reduced in a very non-linear way and by an amount which is dependent on the wind speed.

In contrast to the expressions for the optimized electrical power or thrust, 401, 501, the optimized axial induction factors 301 may generally be expressed by simple means by a truncation of the nominal axial induction factor. This result is exploited in embodiments of the invention as explained in the following.

As may be seen from the results of optimized axial induction factors in FIG. 3, the optimization of total power output taking into account the wake effects may be achieved by the setting of a threshold for the axial induction factor for each wind turbine. The size of the threshold may vary between approximately 40-80% of the maximal nominal axial induction factor and in dependence on the wind direction and thereby on the severity of the wake loss.

Figure 6:
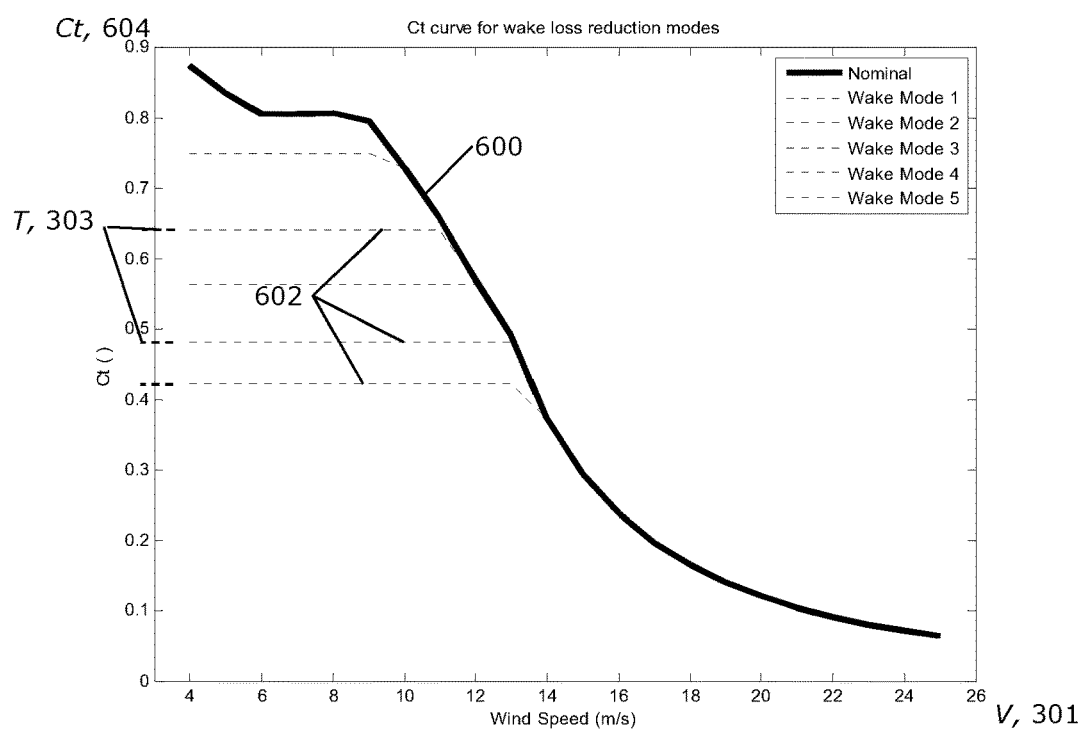
FIG. 6 illustrates the nominal and modified thrust coefficients as a function of wind speed for different wake modes according to an embodiment of the invention.

The optimization described above may likewise be performed with the thrust coefficient $C_t$ for each wind turbine as a design variable. The thrust coefficient is in general given by $$C_t = \frac{Th}{\frac{1}{2}\rho V^2 A},$$

where Th is the aerodynamic thrust on the rotor, $\rho$ is the air density, V is the wind speed, and A is the rotor swept area. The thrust coefficient $C_t$, 604 as a function of the wind speed is shown in FIG. 6. The optimization yields similar result as presented on basis of the axial induction factor a in that the optimized thrust coefficients 601 appear to be truncated functions of the nominal thrust coefficient 600. The optimized thrust coefficient for a given wind speed can thus be set as the nominal thrust coefficient however not exceeding some threshold value T, 602. As also the case with the axial induction factor the size of the threshold T or of the level of truncation depends on the wind park configuration and wind direction.

Figure 7:
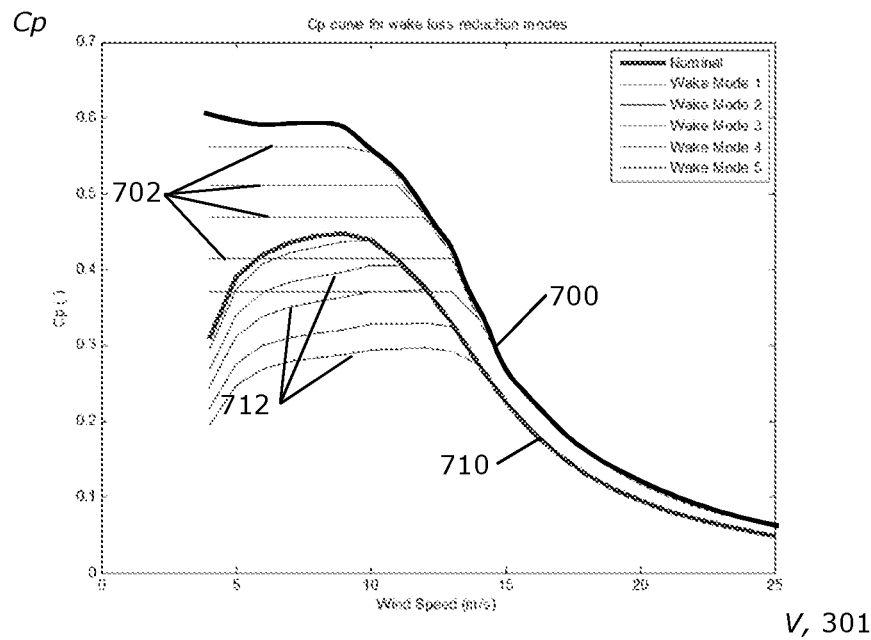
FIG. 7 illustrates the nominal and modified aero dynamical power coefficients as a function of wind speed, as well as the nominal and modified power coefficients for different wake modes according to an embodiment of the invention.

Similarly, the optimization of the total power output may be performed to obtain modified power coefficients. However only when considering the aero dynamical power coefficient Cp, have the optimized curves have been found to be well described by approximately straight lines or truncated curves of the nominal power coefficients in a similar manner to the thrust coefficients $C_t$ and the axial induction factor a. When considering the actual electrical power delivered by the turbine and the power coefficient determined herefrom, this is no longer holds due to a number of losses encountered and dependent on the wind speed. These losses e.g. comprise internal electrical losses (transformer, generator, converter etc.), the internal consumption (to run fans, computers, etc.) and mechanical losses (friction in the drive train etc.). I.e. curves for optimized or modified power coefficients based on the electrical power are not advantageous to use in the proposed control method in the same way as the aero dynamical power coefficient. This may also be clear from FIG. 7, which shows both the nominal aero dynamical 700 and electrical 710 power coefficients as a function of the wind speed V, 301. Also shown are the optimized and modified parameters of the aero dynamical 702 and the electrical 712 power coefficient, respectively. As can be seen from the figure, the modified aero dynamical power coefficients 702 are approximately linear for the lower wind speeds corresponding to truncations of the nominal aero dynamical power coefficient, whereas the electrical power coefficients 712 are all very nonlinear.

Figure 8:
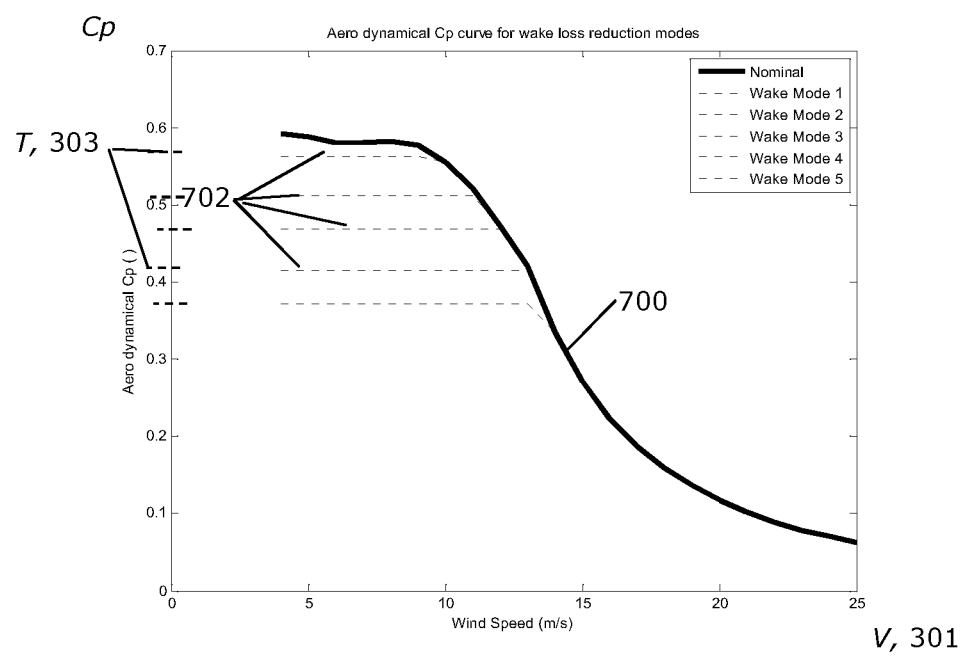
FIG. 8 illustrates the nominal and modified aero dynamical power coefficients for different wake modes of FIG. 7 in greater detail.

FIG. 8 shows the nominal and modified aero dynamical power coefficients 700, 702 alone for a clearer view.

The above described characteristics of the optimized axial induction factor and/or thrust coefficients and/or the aero dynamical power coefficient, are used in the wind park control to define different wake modes as described in the following.

Figure 9:
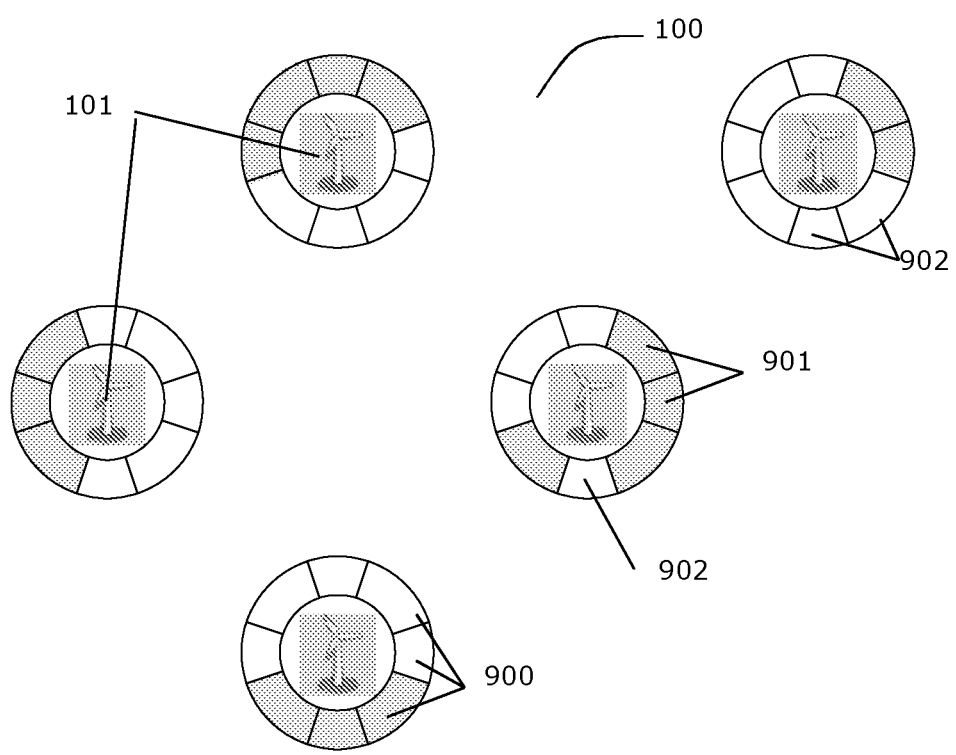
FIG. 9 is a sketch of wind turbines in a park with sectors of different wake modes.

FIG. 9 illustrates the assignment of wake sectors 901 to each wind turbine 101 in the wind park 100. The grey coloured wake sectors 901 indicate that a wind in a direction within the sector causes the turbine 101 to enforce a wake loss on one or several of its neighbouring turbines 101. When the wind is in these wake sectors, special modified power curves and modified production modes are used which allows more wind to pass to the down wind turbines, thus ensuring a higher plant power production. The white sectors 902 are thus sectors of no influence on another wind turbine 101, and when the wind is within these, normal operation is applied to the wind turbine. The wake modes of modified production modes are determined or set such as to correspond to the numerically optimized power production modes as described above in relation to FIGS. 3-8, given by the modified parameters of the axial induction factor a, the thrust coefficient $C_t$, or the aero dynamical power coefficient $C_p$, simply expressed by a truncation of the nominal parameters and/or by the setting an upper threshold T for the parameters.

According to one embodiment of the invention, the modified parameters may be determined by assigning for each wake sector a threshold parameter T. Having determined the present wake sector from the wind direction, the pitch angle (and optionally the rotational speed) is then determined according to the nominal parameters if below the assigned threshold T and otherwise according to the assigned threshold Th.

The entire circumference of each wind turbine may be divided into wake sectors and sectors of no influence, or alternatively only a number of distinct wake sectors for each or some of the wind turbines may be set.

FIG. 9 illustrate the embodiment of the setting of sectors of normal power production and modified power production (wake sectors) where all wake sectors apply the same modified power production. Additionally or alternatively more different types of wake sectors of different modified power production may be set e.g. to take into account sectors or wind directions of more or less severe wake loss or turbulence.

Also the wake sectors 900 may be equally large as shown in FIG. 9 or of different sizes.

The method according to the method may be employed as follows:

If wake losses are anticipated or expected during the siting or planning process of the wind park, the affected or all the turbines are optimized as previously described resulting in one or more wake modes of modified parameters of the axial induction factor a, the thrust coefficient $C_t$, or the aero dynamical power coefficient $C_p$ as a function of the wind speed.

As each wake mode in practise has to be verified before being applied to a wind park in operation, only a limited amount of generic and distinct wake modes may be desired. As a consequence, the theoretically optimal mode cannot be reached, and the resulting power will be slightly below optimum, however still greatly improved.

From this is determined one or more modified power strategies as given by modified parameters of the axial induction factor a, the thrust coefficient $C_t$, or the aero dynamical power coefficient $C_p$ and for all wind speeds, which a turbine should follow when the wind direction is such that wake losses are encountered for that specific turbine. The turbines do not have to use the same power profiles and one turbine can have different power profiles dependent on the direction (as each turbine can have wake interaction with several different turbines, depending on the wind direction).

The modified power strategies may be described by look-up tables implemented in each turbine. All modified power strategies (optionally in the form of the look-up tables) and sector rules defining the wake sectors may optionally be computed offline and predetermined, i.e. before they are to be used in operation.

During operation, the wind speed and wind direction is measured which may be done locally at each wind turbine. Based on the local wind direction measurement and the predetermined wake sectors each turbine then selects which preset modified power strategy or preset table of modified parameters of axial induction factor a, thrust coefficient $C_t$, or aero dynamical power coefficient $C_p$ to use. Based on the local wind speed the turbine uses the selected table or the modified parameters of to determine the pitch reference value for one or more of the wind turbine blades and optionally the rotational speed according to which the wind turbine is finally controlled.

The overall power output of the wind farm is hereby optimized by a local control of each wind turbine independently from the others, and with no communication used between the turbines to minimize the wake losses.

Theoretical investigations have been performed on existing wind farm data with different layouts. Increases in the wind farm power production in the order of 20-40% compared to normal operation have been observed under special wind directions and wind speeds. As these special wind circumstances are not dominating over a year, the impact on the AEP is more moderate. The investigations indicate that AEP increases in the range of 0.5-5% can be obtained with the appropriate technology.

The special characteristics of the modified parameters of the thrust coefficient, aero dynamical power coefficient, and/or the axial induction factor with regard to optimization of the wake losses and yielding truncated curves of the corresponding nominal parameters, are underlined when comparing to the same parameters but optimized with regard to other types of modes.

Figure 10:
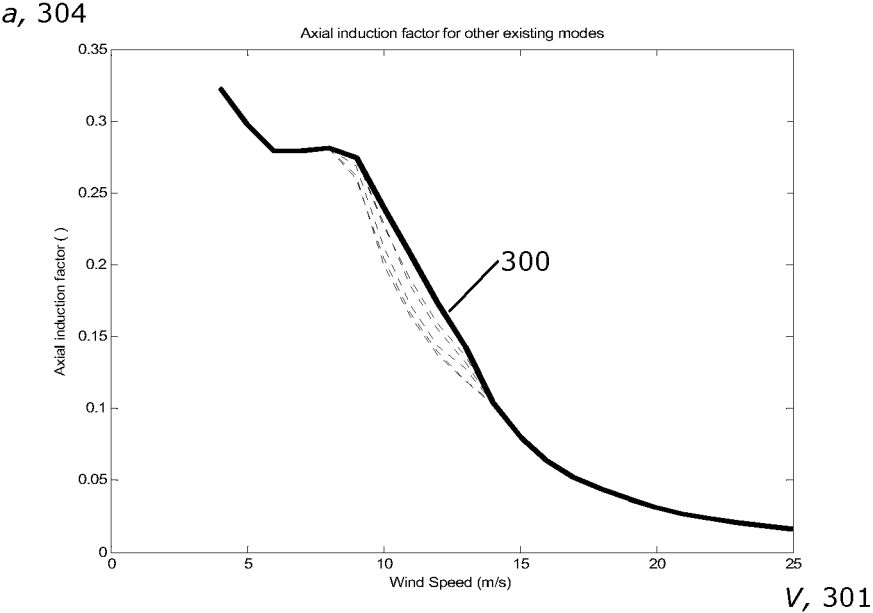
FIGS. 10-13 illustrate the axial induction factor and the thrust coefficient as a function of wind speed for different modes of reduced noise and blade loads according prior art methods and the resulting electrical power and thrust curves, respectively.
Figure 11:
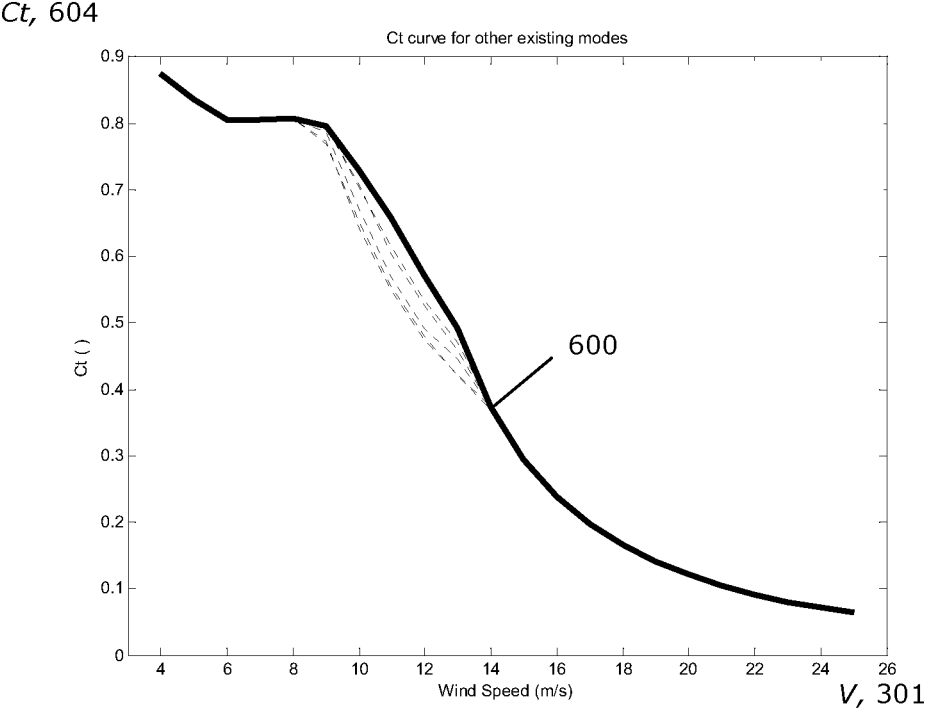

FIGS. 10-11 show the axial induction factor a and the thrust coefficient Ct, respectively, optimized to minimize the noise or the loads. From these can be seen that the optimization leads to modifications of the parameters especially at intermediate wind speeds V, 303, and that the parameters are changed in a way very different from the optimized truncated curves according to embodiments of the invention and as shown in FIGS. 3 and 6.

Figure 12:
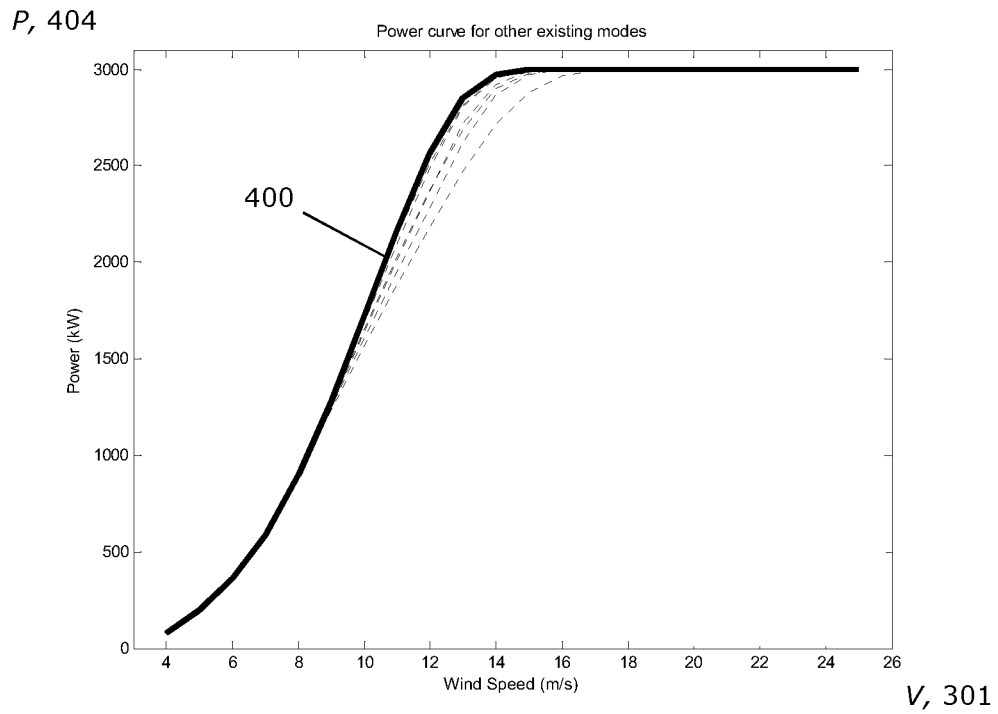
Figure 13:
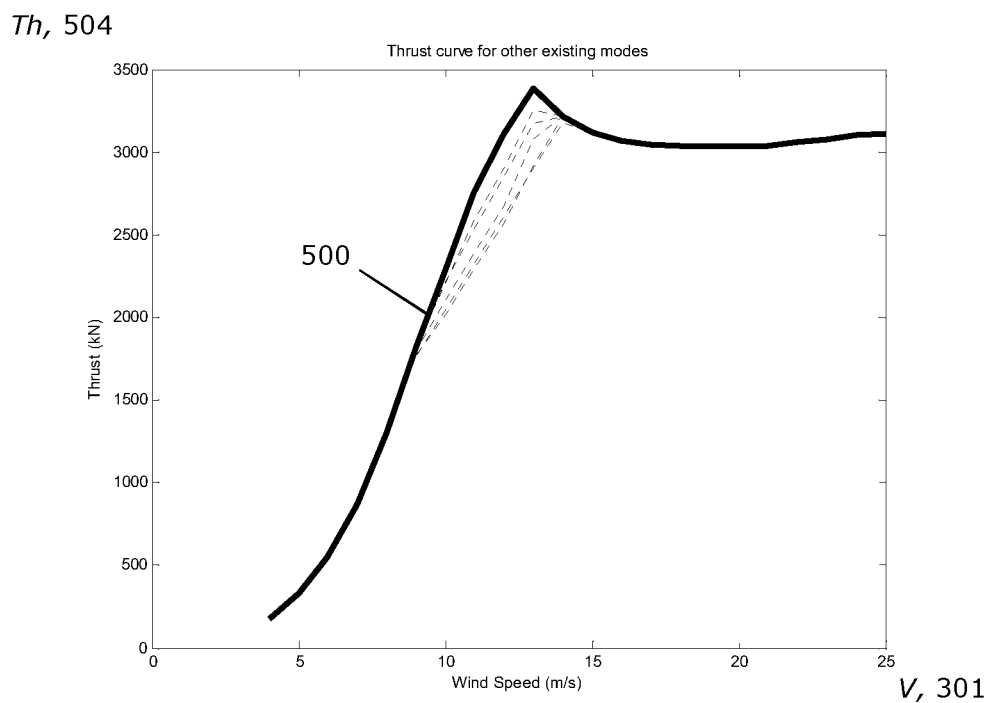

Similarly, the corresponding resulting electrical power P and thrust Th curves shown in FIGS. 12-13 and based on the noise and load optimized parameters of FIG. 10-11 are changed only for intermediate wind speeds V of approximately 10-16 m/s around the nominal wind speed.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A method of controlling a wind turbine of a wind park, the wind turbine comprising blades attached to a rotor hub and a control system for pitching the blades relative to the rotor hub, the method comprising:
   determining a wind direction and a wind speed at the wind turbine; and
   controlling an output parameter of the wind turbine by:
      when the wind direction is outside at least one wake sector assigned to the wind turbine, determining a pitch reference value for one or more of the blades using a normal pitch schedule; and
      when the wind direction is within the at least one wake sector, thereby indicating a wake influence by the wind turbine on one or more other wind turbines of the wind park, determining a wake-dependent pitch reference value for one or more of the blades using a modified pitch schedule,
   wherein the normal pitch schedule comprises pitch reference values as a function of the wind speed and at least one of: a thrust coefficient, an aerodynamic power coefficient, and an axial induction factor,
   wherein the modified pitch schedule comprises pitch reference values depending on the wind speed and at least one modified parameter of: the thrust coefficient, the aerodynamic power coefficient, and the axial induction factor, and
   wherein determining the wake-dependent pitch reference value is performed independent of data describing a current operation of the one or more other wind turbines of the wind park.

2. The method of claim 1, wherein the at least one wake sector comprises a plurality of wake sectors, the method further comprising:
   assigning a respective wake mode to each of the plurality of wake sectors;
   assigning a different modified pitch schedule to each of the wake modes; and
   determining a current wake mode for a current wake sector of the plurality of wake sectors corresponding to the wind direction, and
   determining the wake-dependent pitch reference value using the modified pitch schedule corresponding to the current wake mode.

3. The method of claim 2, further comprising:
   assigning, for each of the wake modes, a threshold parameter for the at least one of: the thrust coefficient, the aerodynamic power coefficient, and the axial induction factor,
   wherein the at least one modified parameter is modified so as not to exceed the threshold parameter.

4. The method of claim 3, wherein the threshold parameter for a wake mode is set as a percentage of at least one parameter of: a maximum thrust coefficient, a maximum aerodynamic power coefficient, and a maximum axial induction factor.

5. The method of claim 4, wherein the percentage is in the range of 50% and 95% of the at least one parameter.

6. The method of claim 5, wherein the percentage is in the range of 70% and 80% of the at least one parameter.

7. The method of claim 3, wherein the threshold parameter for a wake mode is set as a predefined constant.

8. The method of claim 3, wherein the threshold parameter for a wake mode is set as a function of the wind speed.

9. The method of claim 1, wherein at least one of the normal pitch schedule and the modified pitch schedule is predefined.

10. The method of claim 1, further comprising:
    determining the at least one modified parameter from predetermined look-up tables.

11. The method of claim 1, wherein the at least one wake sector is predetermined.

12. The method of claim 2, wherein the respective wake mode is preassigned to each of the plurality of wake sectors.

13. The method of claim 2, wherein the wake modes comprise a mode of normal power production and a mode of reduced power production.

14. The method of claim 1, wherein the wind direction and the wind speed are measured locally on the wind turbine.

15. A method of controlling a plurality of wind turbines of a wind park, wherein each wind turbine of the plurality of wind turbines is locally controlled according to the method of claim 1.

16. A controller for a wind turbine, the controller configured to:
    assign one or more wake sectors to the wind turbine;
    receive one or more signals indicating a wind direction and a wind speed at the wind turbine; and
    control an output parameter of the wind turbine by:
       when the wind direction is outside the one or more wake sectors, determining a pitch reference value for one or more rotor blades of the wind turbine using a normal pitch schedule; and
       when the wind direction is within a first wake sector of the one or more wake sectors, thereby indicating a wake influence by the wind turbine on one or more other wind turbines, determining a wake-dependent pitch reference value for the one or more rotor blades using a modified pitch schedule,
    wherein the normal pitch schedule comprises pitch reference values as a function of the wind speed and at least one of: a thrust coefficient, an aerodynamic power coefficient, and an axial induction factor,
    wherein the modified pitch schedule comprises pitch reference values depending on the wind speed and at least one modified parameter of: the thrust coefficient, the aerodynamic power coefficient, and the axial induction factor, and wherein determining the wake-dependent pitch reference value is performed independent of data describing a current operation of the one or more other turbines.

17. A method of controlling a wind turbine, the method comprising:
assigning one or more wake sectors to the wind turbine;
determining a wind direction and a wind speed at the wind turbine; and
controlling an output parameter of the wind turbine by:
when the wind direction is outside the one or more wake sectors, determining a pitch reference value for pitching one or more rotor blades of the wind turbine using a normal pitch schedule, wherein the normal pitch schedule comprises pitch reference values as a function of the wind speed and a first axial induction factor; and
when the wind direction is within a first wake sector of the one or more wake sectors, thereby indicating a wake influence by the wind turbine on one or more other wind turbines, determining a wake-dependent pitch reference value using a modified pitch schedule, wherein the modified pitch schedule comprises pitch reference values as a function of the wind speed and a second axial induction factor different than the first axial induction factor, and wherein determining the wake-dependent pitch reference value is performed independent of data describing a current operation of the one or more other wind turbines.

18. The method of claim 17, further comprising:
assigning a plurality of sectors that circumscribe the wind turbine, wherein the plurality of sectors comprises the one or more wake sectors and one or more other sectors indicating the wind turbine does not have a wake influence on the one or more other wind turbines.

\* \* \* \* \*